US007043247B2

United States Patent
Chitrapu

(10) Patent No.: US 7,043,247 B2
(45) Date of Patent: May 9, 2006

(54) ROUTING HEADER BASED ROUTING IN INTERNET PROTOCOL (IP)-CELLULAR NETWORKS

(75) Inventor: Prabhakar R. Chitrapu, Blue Bell, PA (US)

(73) Assignee: InterDigital Technology corporation, Wilmington, DE (US)

(*) Notice: Subject to any disclaimer, the term of this patent is extended or adjusted under 35 U.S.C. 154(b) by 0 days.

(21) Appl. No.: 10/328,662

(22) Filed: Dec. 23, 2002

(65) Prior Publication Data

US 2004/0203801 A1    Oct. 14, 2004

Related U.S. Application Data

(60) Provisional application No. 60/393,358, filed on Jul. 1, 2002.

(51) Int. Cl.
    H04Q 7/20    (2006.01)
    H04M 1/00   (2006.01)
    H04M 3/42   (2006.01)
    H04B 1/38    (2006.01)
    H04L 12/28   (2006.01)
    H04J 3/22    (2006.01)

(52) U.S. Cl. ............... 455/445; 455/422.1; 455/414.4; 455/434; 455/550.1; 455/554.2; 455/560; 370/401; 370/466

(58) Field of Classification Search ............... 709/238, 709/239, 242, 225, 227; 455/422.1, 432.1, 455/432.2, 433, 435.1, 445, 453, 414.1–414.4, 455/434, 550.1, 554.2, 556.1, 556.2, 557–558, 455/560–561; 370/465–467, 401, 395.52, 370/395.5, 310, 328, 352
See application file for complete search history.

(56) References Cited

U.S. PATENT DOCUMENTS

| 5,720,032 | A  |   | 2/1998  | Picazo, Jr. et al. |
|-----------|----|---|---------|--------------------|
| 6,091,706 | A  |   | 7/2000  | Shaffer et al.     |
| 6,118,784 | A  | * | 9/2000  | Tsuchiya et al. ............ 370/401 |
| 6,172,986 | B1 |   | 1/2001  | Watanuki et al.    |
| 6,178,235 | B1 |   | 1/2001  | Peterson et al.    |
| 6,195,706 | B1 | * | 2/2001  | Scott ........................ 709/245 |
| 6,587,438 | B1 | * | 7/2003  | Brendel ..................... 370/238 |
| 6,591,306 | B1 | * | 7/2003  | Redlich ...................... 709/245 |
| 6,614,765 | B1 | * | 9/2003  | Bruno et al. ................ 370/255 |
| 6,721,297 | B1 | * | 4/2004  | Korus et al. ................ 370/338 |
| 6,862,274 | B1 | * | 3/2005  | Tsao et al. .................. 370/338 |
| 2001/0044305 | A1 | * | 11/2001 | Reddy et al. ............... 455/437 |
| 2001/0048686 | A1 | * | 12/2001 | Takeda et al. .............. 370/401 |

(Continued)

OTHER PUBLICATIONS

Loukola, M.V. and Skytta J.O., "New Possibilities Offered by IPv6" 1998 IEEE; Department of Electrical and communications Engineering, Helsinki University of Technology, P.O.Box 3000, 02015 HUT, Finland.*

(Continued)

*Primary Examiner*—William Trost
*Assistant Examiner*—Meless Zewdu
(74) *Attorney, Agent, or Firm*—Volpe and Koenig, P.C.

(57) ABSTRACT

Internet protocol version 6 (IPv6) is utilized throughout the entire cellular network and employs routing headers of the packets to ensure that the packets are routed via the gateway router (GR) to the end destination which is accomplished by a user equipment (UE) specifying the IP address of the gateway router as the IP address of an intermediate router in the routing header. Packets may also be routed to UEs from the GR through an intermediate router.

22 Claims, 3 Drawing Sheets

U.S. PATENT DOCUMENTS

| | | |
|---|---|---|
| 2002/0012320 A1 | 1/2002 | Ogier et al. |
| 2002/0099856 A1* | 7/2002 | Shitama ..................... 709/249 |
| 2002/0196781 A1* | 12/2002 | Salovuori ................... 370/352 |
| 2003/0005089 A1* | 1/2003 | Kumar ....................... 709/220 |
| 2003/0016655 A1* | 1/2003 | Gwon ........................ 370/352 |
| 2003/0074570 A1* | 4/2003 | Miyoshi ..................... 713/190 |
| 2003/0081578 A1* | 5/2003 | White et al. ................ 370/338 |
| 2003/0081592 A1* | 5/2003 | Krishnarajah et al. ...... 370/352 |
| 2003/0156584 A1* | 8/2003 | Bergenlid et al. ........... 370/389 |
| 2003/0227911 A1* | 12/2003 | Trossen ..................... 370/352 |

OTHER PUBLICATIONS

Jian Cai and David J. Goodman, *General Packet Radio Service in GSM*, Oct. 1997, *IEEE Communications Magazine*, pp. 122-131.

\* cited by examiner

ROUTING HEADER BASED ROUTING IN INTERNET PROTOCOL (IP)-CELLULAR NETWORKS

CROSS REFERENCE TO RELATED APPLICATIONS

This application claims priority from U.S. provisional application No. 60/393,358 filed on Jul. 1, 2002, which is incorporated by reference as if fully set forth.

BACKGROUND

This invention relates to cellular networks. More particularly, the invention relates to a technique employing routing headers in internet protocol (IP) packets to route packets to an end destination through intermediate routers employing routing headers.

FIG. 1 shows a typical cellular network such as a Global System for Mobile Communications/Generalized Packet Switched Service (GSM/GPRS) network. In IP-applications there is a single point of attachment to the external IP-networks such as the Public Internet, the single point of attachment being a gateway general packet radio service support node (GGSN) also referred to in FIG. 1 as the gateway router GR. The Gateway Router is connected to the Public Internet and also to X.25 Networks via Firewalls F2 and F1 respectively. On the radio network side, the Gateway Router is coupled to the intra-public land mobile network (Intra-PLMN) internet protocol IP) backbone for sending two-way data from multiple user equipments (UEs). The IP-layer in the user equipment (UE) terminates at the GGSN which, in turn, means that there is a single "IP-level-hop" from the UE to the GGSN. FIG. 2 shows the protocol stacks used for exchanging IP data between the user equipment, also referred to as the mobile station (MS), base station sub-system (BS), the serving GPRS support node (SGSN) and the gateway GPRS support node (GGSN).

Typically, the UMTS network is made up of switching elements which transfer the IP-packets through the employment of Layer-2 switching techniques. Some UMTS networks utilize IP-based routing elements. However, the IP-technology is used purely for transport purposes only and is not visible to the UE, meaning that the IP-layer of the UE is still terminated at the GGSN.

It is a clear possibility that future cellular networks will be entirely IP-based. In other words, the cellular network will be an interconnected network of IP-routers with the result that the IP-layer of the UE may be terminated by a nearby router. However, since the network is still assumed to have a single point of attachment to the external IP-networks, IP packets from the nearest router must be routed to the gateway router GR (for example, the GGSN shown in FIG. 1). In the prior art, this is achieved by establishing IP-tunnels which involve IP-in-IP encapsulation. This approach has the disadvantages of requiring the need to set up tunnels and the extra overhead due to encapsulation.

Another scenario is a network of a number of LAN Access Routers (ARs), wherein each Access Router is connected to a number of Access Points, as shown in FIG. 3. A single gateway router serves these ARs and provides connectivity to the external IP-networks. Such a network may also be referred to as an Autonomous System or an IP-domain. Other scenarios include universal mobile telecommunications system (UMTS) networks, code division multiple access CDMA2000 networks etc.

SUMMARY

The present invention utilizes internet protocol version 6 (IPv6) throughout the entire cellular network and employs routing headers of the IPv6 packets to ensure that the packets are routed via the gateway router to the end destination which is accomplished by specifying the IP address of the gateway router as the IP address of an intermediate router in the routing header.

BRIEF DESCRIPTION OF THE DRAWING(S)

The present invention will be understood from a consideration of the figures in which like elements are designated by like numerals and, wherein.

DETAILED DESCRIPTION OF THE PREFERRED EMBODIMENT(S)

The present invention eliminates the disadvantages of the prior art through the utilization of internet protocol version 6 (IPv6) throughout the entire Cellular Network and using Routing Headers of IPv6 packets to ensure that the packets are routed via the gateway router to the end destination. This is accomplished through the present invention by specifying the IP-address of the gateway router as an IP-address of an intermediate router in the routing header.

Figure 1:
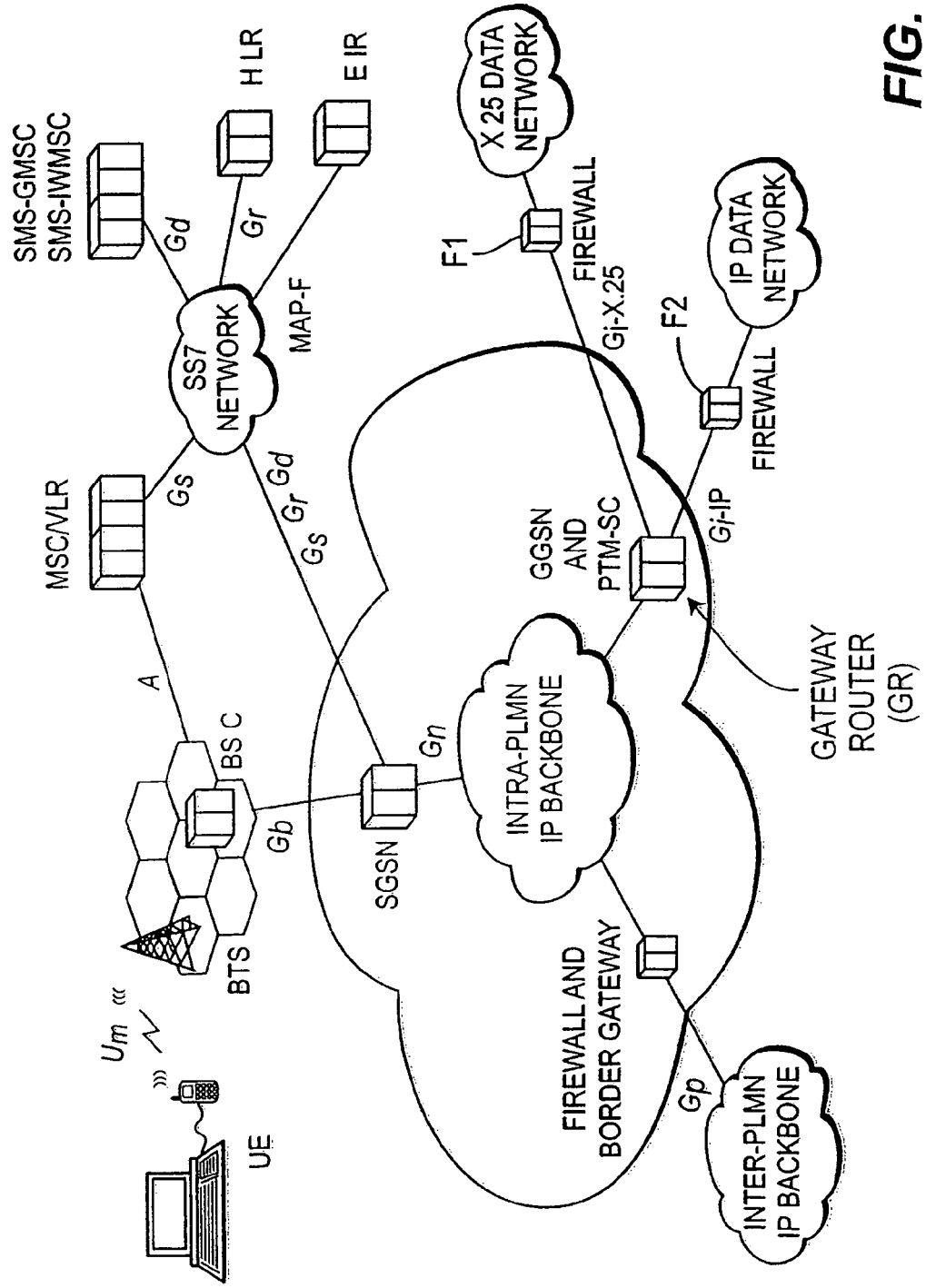
FIG. 1 shows a typical global system for mobile communications/general packet radio service (GSM/GPRS) cellular network.
Figure 2:
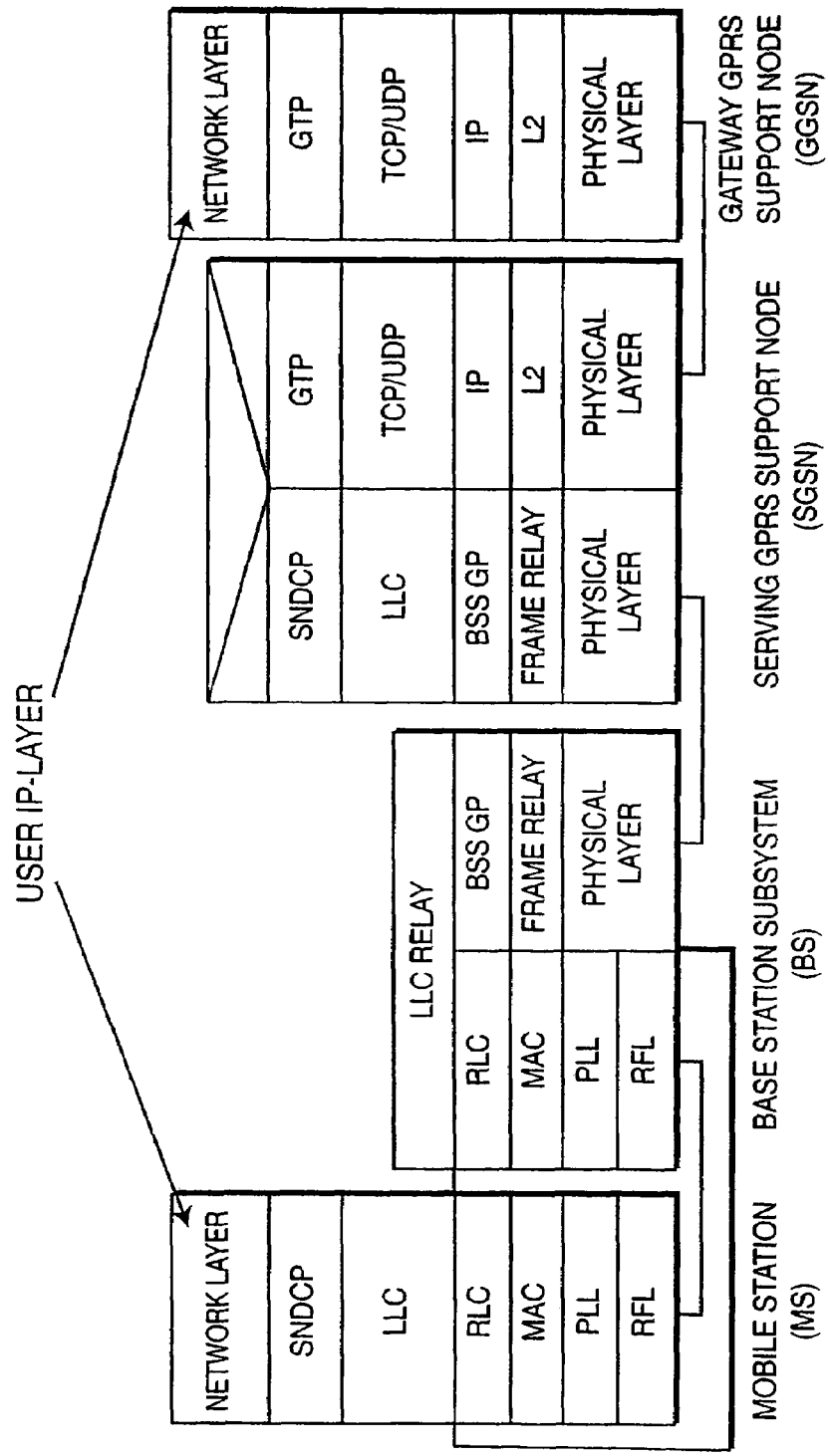
FIG. 2 shows the layers making up the mobile station, base station, SGSN and GGSN of FIG. 1.
Figure 3:
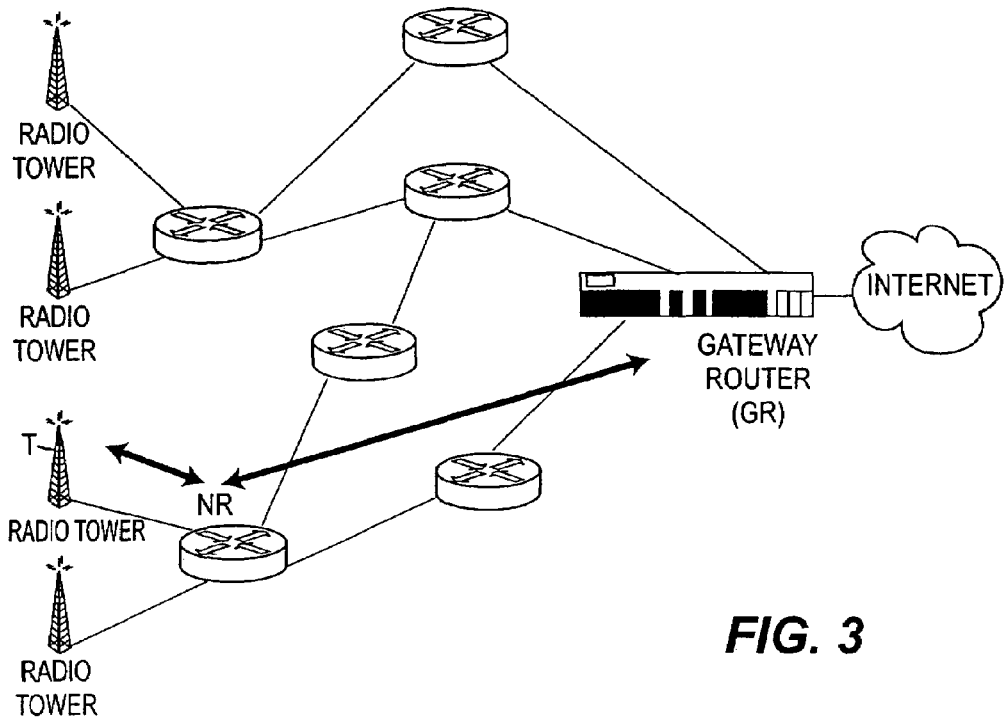
FIG. 3 shows a network employing WLAN Access Routers connected to a number of Access Points.

As shown in FIG. 3, user IP packets are sent from the UE (see also FIG. 1) to the nearest router NR shown, by way of the radio tower T (see FIGS. 1 and 3) and then to the gateway router GR. The IPv6 header of the UE IP packets contain the IP address of the Gateway Router GR in the Routing Header. At a minimum, the Gateway Router is a simple IP Router that can route IP packets based on their destination IP address. However, the Gateway Router may have additional features, such as Source Address based Routing, Network Address Translation, QoS based Routing (such as DiffServ, MPLS ete), Secure Firewalls, etc. In addition, the gateway router has the capability of sending messages to the UE as to the addresses of those routers which may be included in a routing header in order to select a router or routers having smaller or no traffic loads.

Figure 4:
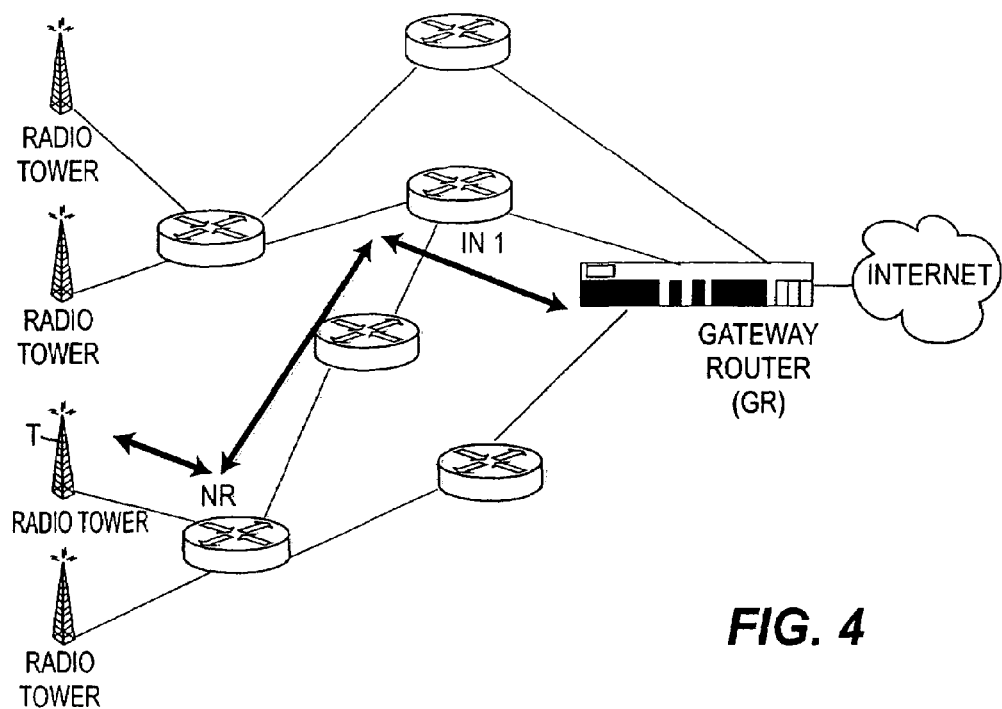
FIG. 4 shows a network similar to the network of FIG. 3 and further describing the manner in which routers are used as intermediate nodes.

Another aspect of the invention is the provision of additional routers which serve as nodes. The selection of intermediate routers is based on criteria such as congestion state and/or capacity and/or monitoring needs. For example, noting FIG. 4, the user IP packets are sent from the UE through radio tower T to the nearest router NR, typically referred to as an access router, by way of the radio tower T and then to an intermediate node router such as IN 1 and finally to the gateway router GR, serving as the gateway to the internet. The reason for routing the IP packets via IN1 may be that IN1 is not congested with excessive traffic, compared to other routers that could have been used to send IP packets from NR to GR. Alternately, the reason for routing the IP packets via IN1 may be that traffic monitoring equipment is connected to IN1, and a legal requirement that all IP packets emanating from one or more UEs are to be monitored. The IPv6 header of the User IP packets contain the IP addresses of the intermediate router IN 1 and the Gateway Router GR in the Routing Header, eliminating the need for tunneling and encapsulation. There are several ways in which the IPv6 routing headers are populated with the appropriate IP addresses of the Gateway Router as well as additional Intermediate Routers.

As one example, the UE constructs the IPv6 packets with this routing header information. This method requires that the UE is made aware of the necessary information regarding the IPv6 addresses of the GR and the Intermediate Nodes. For example, the Network may inform the UE prior to data transmission.

Another technique is to allow the NR to perform this task. In this scenario, the UE need not be aware of the IP routing within the cellular network at all. In fact, the UE may even be an IPv4 device. The Nearest Access Router will be equipped to perform address translation (from IPv4 to IPv6) if necessary and to add the appropriate IPv6 Routing Header. The advantage of this technique is that the NR, being part of the fixed network of the cellular system, can be made aware of the network status (in terms of congestion, failures etc), as well as the need for processing by special intermediate nodes for purposes such as legal interception.

As another alternative embodiment, the GR may add and/or modify routing headers of received packets and convey the packets to a UE through an access router, access router being a standard term typically designated as the first router communicating with a UE through a radio tower.

What is claimed is:

1. A method employed in a cellular network having a plurality of routers and a gateway router, said method ensuring that internet protocol (IP) packets from a user equipment (UE) are routed by the gateway router to an end destination, comprising:
    said UE selecting one of said plurality of routers as an access router and transmitting internet protocol version 6 (IPv6) packets to said access router through a radio tower communicating with the UE;
    said UE providing an IP address of the gateway router in a routing header; and
    said access router sending user IP packets received from said UE to the gateway router responsive to information in the routing header; and
    said gateway router sending the user IP packets received from the access router to the end destination.

2. The method of claim 1 wherein said access router intercepts IPv6 packets from the UE and inserts the address of at least another one of said routers which serves as an intermediate node.

3. The method of claim 2 wherein an intermediate node is selected to avoid network congestion.

4. The method of claim 2 wherein the intermediate node is selected to enable lawful interception.

5. A method employed in a cellular network having a plurality of routers and a gateway router, said method ensuring that internet protocol (IP) packets from a user equipment (UE) are routed by the gateway router to an end destination comprising:
    said UE selecting one of said routers as an access router and transmitting internet protocol version 6 (IPv6) packets to said access router through a radio tower communicating with the UE; and
    said access router intercepting IPv6 packets from the UE and inserting a routing header to include an address of the gateway router; and
    the gateway router sending the IPv6 packets received from the access router to the UE.

6. The method of claim 5 wherein the insertion step performed by the access router further includes inserting an address of at least another one of said plurality of routers which serves as an intermediate node.

7. The method of claim 5 wherein an intermediate node is selected to avoid network congestion.

8. The method of claim 5 wherein the intermediate node is selected to enable lawful interception.

9. A method employed in a cellular network having a plurality of routers and a gateway router, said method ensuring that internet protocol (IP) packets from a user equipment (UE) are routed by the gateway router to an end destination, comprising:
    said UE selecting one of said plurality of routers as an access router and transmitting internet protocol version 4 (IPv4) packets to said access router through a radio tower communicating with the UE;
    said access router intercepting IPv4 packets from the UE and translating to an IPv6 address and inserting a routing header to include an address of the gateway router; and
    said gateway router sending packets received from said access router to the UE.

10. The method of claim 9 wherein the insertion step performed by the access router further includes an address of at least another one of said plurality of routers which serves as an intermediate node between said access router and said gateway router.

11. A method employed in a cellular network having a plurality of routers and a gateway router, said method ensuring that internet protocol (IP) packets from a user equipment (UE) are routed by the gateway router to an end destination, comprising:
    said gateway router sending a message to the UE to include an address of at least one of the plurality of routers in a routing header;
    said UE selecting said at least one of said plurality of routers as an access router and transmitting internet protocol version 6 (IPv6 ) packets to said access router through a radio tower communicating with the UE; and
    said UE providing an IP address of the gateway router in the routing header; and
    said gateway router sending IP packets received from the access router to the UE.

12. The method of claim 11 wherein said gateway router selects an address of at least another one of the plurality of routers based on a determination of traffic loads of said plurality of routers.

13. A method employed in one of a cellular network, WLAN network and radio network having a plurality of routers and a gateway router, said method insuring that internet protocol (IP) packets from a user equipment (UE) are routed by the gateway router to an end destination, comprising:
    said UE selecting one of said plurality of routers as an access router and transmitting internet protocol version 6 (IPv6 ) packets to said access router through a radio tower communicating with the UE;
    said UE providing an IP address of the gateway router in a routing header; and
    said access router sending user IP packets received from said UE to the gateway router responsive to information in the routing header; and
    said gateway router sending IP packets received from said access router to said UE.

14. A routing method for use in an internet protocol (IP) cellular network having a gateway router and a plurality of routers utilized as intermediate nodes, comprising:
- a user equipment (UE) selecting one of said plurality of routers as an intermediate router and transmitting internet protocol (IP) packets employing internet protocol version 6 (IPv6) specifying the internet protocol (IP) address of said intermediate router and a gateway router in a routing header;
- the UE initially transmitting said IP packets to another one of the plurality of routers designated as an access router through a radio tower;
- said access router transmitting the IP packets received from the UE to said intermediate node whose address is in the routing header; and
- said intermediate node transmitting the IP packets to the gateway router responsive to a gateway router address provided in the routing header; and
- said gateway router sending IP packets received from the intermediate mode to said UE.

15. A method employed in a cellular network having a plurality of routers and a gateway router for ensuring that internet protocol packets are routed to a user equipment (UE) from an end destination through the gateway router, comprising:
- said gateway router receiving incoming packets from the end destination, said packets having a routing header;
- said gateway router modifying the routing header to designate one of said plurality of routers as an access router and sending said received IP packets directly to said access router; and
- said access router sending said IP packets received directly from the gateway router to the UE responsive to information in the routing header.

16. The method of claim 15 wherein said access router communicates with said UE through a radio tower.

17. Apparatus employed in a cellular network having a plurality of routers and a gateway router for insuring that internet protocol packets from a user equipment (UE) are routed by a gateway router to an end destination, comprising:
- said UE having means for transmitting internet protocol version 6 (IPv6) packets to one of said plurality of routers designated as a nearest router by said UE;
- said UE further having means providing an IP address of the gateway router in a routing header; and
- said nearest router having means for sending IP packets received from said UE to the gateway router responsive to information in the routing header; and
- said gateway router sending IP packets received from the nearest router to said UE.

18. The apparatus of claim 17 wherein said gateway router comprises:
- means for transmitting the IP packets to an end destination through an IP network.

19. The apparatus of claim 17 further comprising radio tower means for transmitting the IP packets received from the UE to the nearest router.

20. A cellular network having a plurality of routers and a gateway router for ensuring that internet protocol packets are routed to a user equipment (UE) from an end destination through the gateway router, comprising:
- said gateway router having means for adding a routing header to incoming packets from the end destination;
- said gateway router having further means for selecting one of said plurality of routers as an access router and sending said routing header and received IP packets directly to said access router; and
- said access router having means for sending said IP packets received from the gateway router to the UE responsive to information in the routing header.

21. The network of claim 20 wherein the IP packets are (IPv4) version packets, said access router converting the (IPv4) version packets to (IPv6) version packets.

22. A system having at least one cellular network, WLAN network and radio network, the cellular network having a plurality of routers and a gateway router, and which ensure that internet protocol (IP) packets from a user equipment (UE) are routed by the gateway router to an end destination, comprising:
- said UE having means for selecting one of said plurality of routers as an access router and transmitting internet protocol version 6 (IPv6) packets to said access router through a radio tower communicating with the UE;
- said UE having further means for providing the IP address of the gateway router in a routing header; and
- said access router having means for sending IP packets received from said UE to the gateway router responsive to information in the routing header; and
- said gateway router sending IP packets received from the access router to the UE.

* * * * *

UNITED STATES PATENT AND TRADEMARK OFFICE
CERTIFICATE OF CORRECTION

PATENT NO. : 7,043,247 B2 Page 1 of 1
APPLICATION NO. : 10/328662
DATED : May 9, 2006
INVENTOR(S) : Prabhakar R. Chitrapu It is certified that error appears in the above-identified patent and that said Letters Patent is hereby corrected as shown below:

ON THE TITLE PAGE

Item (56), U.S. PATENT DOCUMENTS, page 1, right column, line 6, delete "6,178,235 B1 1/2001 Peterson, et al." and insert therefor --6,178,235 B1 1/2001 Petersen et al--.

Item (56), OTHER PUBLICATIONS, Page 1, right column, Line 3, after the words "Electrical and", delete "commu-" and insert therefor --Commu- --.

IN THE CLAIMS

At claim 1, column 3, line 42, after the word "header;", delete "and".

At claim 5, column 3, line 64, after "UE;", delete "and".

At claim 11, column 4, line 42, after "UE;", delete "and".

At claim 13, column 4, line 62, after the word "header;", delete "and".

At claim 14, column 5, line 15, after the word "header;", delete "and".

At claim 17, column 5, line 46, after the word "header;", delete "and".

At claim 22, column 6, line 41, after the word "header;", delete "and".

Signed and Sealed this

Fourteenth Day of August, 2007

JON W. DUDAS
*Director of the United States Patent and Trademark Office*